United States Patent [19]

Ng

[11] Patent Number: 5,613,780
[45] Date of Patent: Mar. 25, 1997

[54] LINEAR MOTION BEARING ASSEMBLY

[75] Inventor: Alison Ng, N.Y., N.Y.

[73] Assignee: Thomson Industries, Inc., Port Washington, N.Y.

[21] Appl. No.: 496,759

[22] Filed: Jun. 29, 1995

[51] Int. Cl.$^6$ .................................. F16C 29/06
[52] U.S. Cl. ........................ 384/43; 29/898.03
[58] Field of Search ................. 384/43, 44, 49; 29/898.03

[56] References Cited

U.S. PATENT DOCUMENTS

| | | | |
|---|---|---|---|
| 3,545,826 | 12/1970 | Magee et al. | 384/43 |
| 3,767,276 | 10/1973 | Henn | 384/43 |
| 3,951,472 | 4/1976 | Schurger et al. | 384/43 |
| 4,201,424 | 5/1980 | Ernst et al. | 384/43 |
| 4,227,751 | 10/1980 | Albert | 384/43 |
| 4,456,312 | 6/1984 | Rogers, III et al. | 384/43 |
| 4,480,879 | 11/1984 | Reith et al. | 384/43 |
| 4,717,264 | 1/1988 | Walter et al. | 384/43 |
| 4,789,249 | 1/1988 | Mutolo | 384/43 |
| 4,815,862 | 3/1989 | Mugglestone et al. | 384/43 |
| 5,046,862 | 9/1991 | Ng | 384/43 |
| 5,221,145 | 6/1993 | Borel | 384/43 |

Primary Examiner—Thomas R. Hannon
Attorney, Agent, or Firm—Dilworth & Barrese

[57] ABSTRACT

A linear motion bearing assembly as provided for movement along a shaft. The ball retainer of the bearing assembly is assembled from a plurality of arcuate interengageable self-contained ball retainer segments. Preferably, the plurality of segments are all identical and can be assembled to a variety of configurations for either open-type bearing assemblies or closed-type bearing assemblies. Each of the ball retainer segments includes at least one ball track having a load bearing portion and a return portion. These segments are preferably formed of an engineering polymer and are substantially self-contained to protect the bearing balls contained therein from ambient contamination. At least one load bearing plate is axially positioned in each segment and serves to receive and transmit loads from the bearing balls in the load bearing portion of the ball tracks. The load bearing plates are preferably retained in the segments to facilitate ease of assembly and to eliminate the need for an outer housing. The segments are joined together to form the overall bearing assembly either through interlocking structure formed on each segment or by retainer clips or bands. Optionally, end seals may be positioned on the longitudinal ends to protect the bearing assembly from ambient contamination. A novel and efficient assembly process is also provided for linear motion bearing assemblies. This process includes the steps of providing a plurality of arcuate self-contained ball retainer segments, each of said segments including at least one ball track having a load bearing portion and a retainer portion; loading a plurality of bearing balls into the ball track; positioning a load bearing plate in the segment adjacent the load bearing portion of the ball track; and assembling the arcuate self-contained ball retainer segments to form a linear motion bearing assembly.

21 Claims, 6 Drawing Sheets

5,613,780

LINEAR MOTION BEARING ASSEMBLY

FIELD OF THE INVENTION

The present invention relates to anti-friction linear motion bearing assemblies and, more particularly, to multiple track linear bearing assemblies for longitudinal movement along a shaft.

DESCRIPTION OF THE RELATED ART

The present invention is directed to improvements in linear motion bearing assemblies. In particular, the improvements relate to linear motion bearing assemblies of the type which support a carriage or pillow block for linear movement along a support member such as an elongated shaft or spline. These bearing assemblies can either be of the open type or the closed type.

Prior art bearing assemblies typically include an outer housing and a ball retainer dimensioned for insertion into the outer housing. The ball retainer has a plurality of ball tracks in a loop configuration for containing and recirculating bearing balls. The ball tracks include open portions which facilitate load transfer from the supporting shaft to load bearing structure such as load bearing plates operatively associated with either the ball retainer or the outer housing. Return portions of the ball tracks permit continuous recirculation of the bearing balls through the ball tracks during linear motion.

In some embodiments, the ball retainer is formed as a monolithic element with the ball tracks integrally incorporated therein. See, U.S. Pat. No. 3,767,276 to Henn. This structure, however, is difficult to efficiently manufacture because of the complex molds required. Also, these ball retainers, prior to insertion into a mounting carriage or outer housing are necessarily open and thus exposed to ambient conditions and contaminants such as dust and dirt. Such exposure could deleteriously affect the operation and life of the bearing assembly as well as the support structure on which it moves.

Self-contained linear bearing units are also known in the art. See, e.g. U.S. Pat. No. 4,815,862 to Mugglestone et al. This unit, while representing a marked improvement in the art, still requires the use of end caps to engage the load bearing plates of the bearing segments. Further, the load bearing plates must be precisely machined to properly interfit with the end caps. This configuration adds to the expense and complexity of the bearing.

The load bearing structure may be in the form of integral elements formed on an inner radial surface of the outer housing. Typical bearing assemblies utilizing load bearing structure formed in the outer housing are shown, for example, in commonly owned U.S. Pat. No. 5,046,862 to Ng, the disclosure of which is incorporated herein by reference.

In lieu of integral load bearing structure, separate load bearing plates may be used to transfer loads from the supporting shaft. These load bearing plates are longitudinally oriented in association with the ball retainer so as to engage at least those bearing balls in direct contact with the support shaft. These load bearing plates may also be configured to be axially self-aligning by providing structure which permits the plates to rock into and out of parallelism with the longitudinal axis of the ball retainer. See, for example, commonly owned U.S. Pat. No. 3,545,826 to Magee et al. Individual load bearing plates may be expanded transversely so as to engage bearing balls in corresponding adjacent load bearing tracks. In this form, parallel grooves are formed in the underside of the plates to guide the bearing balls while they are in the load bearing portion of the ball tracks. See, for example, U.S. Pat. No. 3,951,472 to Schurger et al.

The outer housing of existing bearing assemblies is typically in the form of a one piece hollow steel cylinder which serves to, inter alia, retain and protect the ball retainer and balls. See, for example, U.S. Pat. Nos. 5,046,862 to Ng and 3,767,276 to Henn, discussed above. While useful, this type of outer housing increases the weight and expense of the bearing assembly.

Accordingly, it is one object of the present invention to provide a linear motion bearing assembly which can be easily and efficiently manufactured.

It is another object of the present invention to provide a linear motion bearing assembly having a ball retainer formed of self-contained segments which are easily fabricated using engineering polymers.

It is a further object of the present invention to provide a low cost, light weight linear motion bearing assembly having high load bearing capacity without the need for an outer housing.

It is another object of the present invention to provide a simple and efficient fabrication and assembly process for a linear motion bearing assembly.

SUMMARY OF THE INVENTION

The present invention provides a linear motion bearing assembly for movement along a shaft. The ball retainer of the bearing assembly is assembled from a plurality of self-contained ball retainer segments. Preferably, the plurality of segments are all identical and can be assembled to a variety of configurations for either open-type bearing assemblies or closed-type bearing assemblies. Each of the ball retainer segments includes at least one ball track having a load bearing portion, a return portion and a turnaround portion. These segments can be easily formed from an engineering polymer and are substantially self-contained to protect the bearing balls contained therein from ambient contamination.

At least one load bearing plate is axially positioned in each segment and serves to receive and transmit loads from the bearing balls in the load bearing portion of the ball tracks. The load bearing plates are preferably retained in the segments to facilitate ease of assembly and to help eliminate the need for an outer housing.

In an alternate embodiment, each ball retainer segment includes a plurality of ball tracks therein and a corresponding number of load bearing plates. The ball tracks can either be parallel or longitudinal in arrangement.

The segments are joined together to form the overall bearing assembly either through interlocking structure formed on each segment or by retainer clips or bands. Optionally, end seals or wipers may be positioned on the longitudinal ends to protect the bearing assembly from ambient contamination.

The present invention also provides a novel and efficient assembly process for linear motion bearing assemblies. This process includes the steps of providing a plurality of arcuate self-contained ball retainer segments, each of said segments including at least one ball track having a load bearing portion and a retainer portion; loading a plurality of bearing balls into said ball track; positioning a load bearing plate in said segment adjacent the load bearing portion of the ball track; and assembling said arcuate self-contained ball retainer segments to form a linear motion bearing assembly.

BRIEF DESCRIPTION OF THE DRAWINGS

The accompanying drawings, referred to herein and constituting a part hereof, illustrate the preferred embodiments of the linear motion bearing assembly of the present invention and, together with the description, serve to explain the principles of the invention.

DETAILED DESCRIPTION OF PREFERRED EMBODIMENTS

Figure 1:
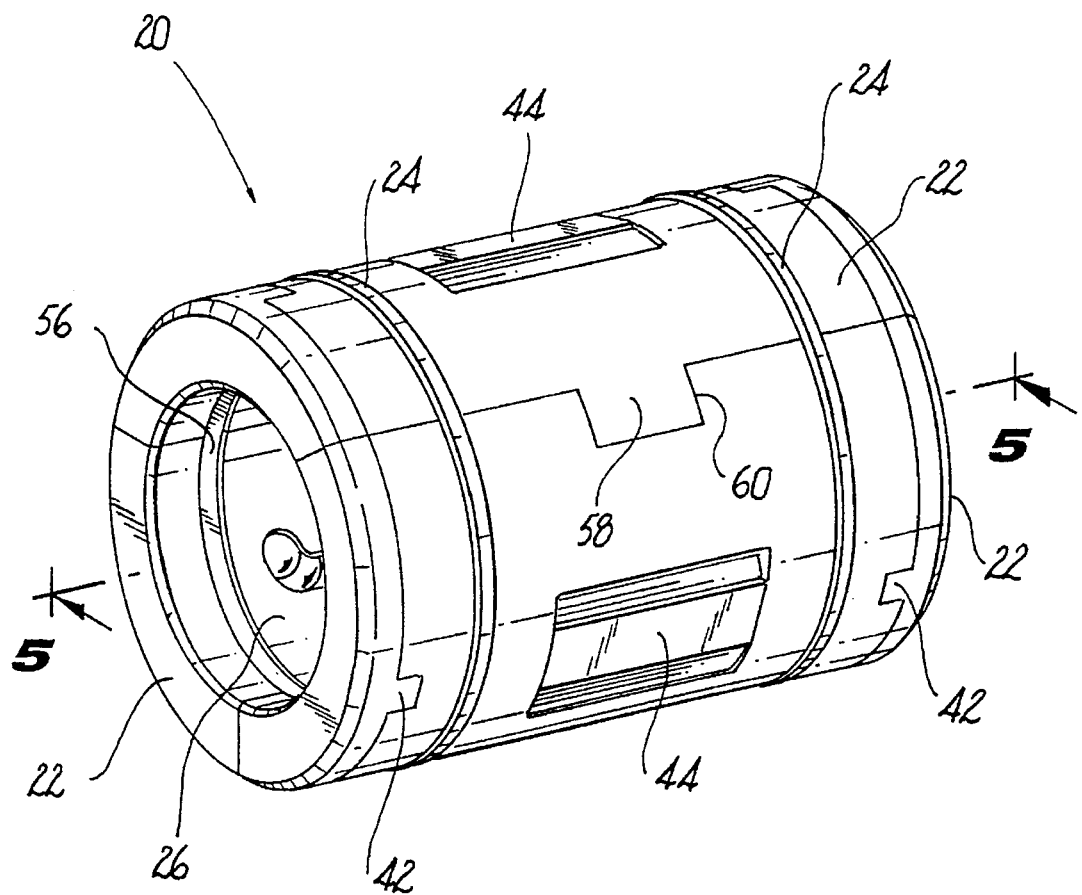
FIG. 1 is a perspective view of an assembled linear motion bearing assembly in accordance with one embodiment of the present invention.

Referring now to the drawings, wherein like reference numerals identify similar structural elements of the subject invention, there is illustrated in FIG. 1 a closed-type linear motion bearing assembly constructed in accordance with a preferred embodiment of the present invention and designated generally by the reference numeral 20. Linear motion bearing assembly 20 is fabricated from individual arcuate interengageable self-contained ball retainer segments 22 which are supported in interengageable association by retainer rings 24. The linear motion bearing assembly 20 of FIG. 1 is fabricated from three 120° arcuate interengageable self-contained ball retainer segments 22. One skilled in the art will readily appreciate that the linear motion bearing assembly could be fabricated using two or more self-contained segments simply by configuring and dimensioning the arcuate degree and size of the segments. Further, although shown as a closed-type bearing, an open-type bearing could be readily fabricated using such self-contained segments.

Figure 2:
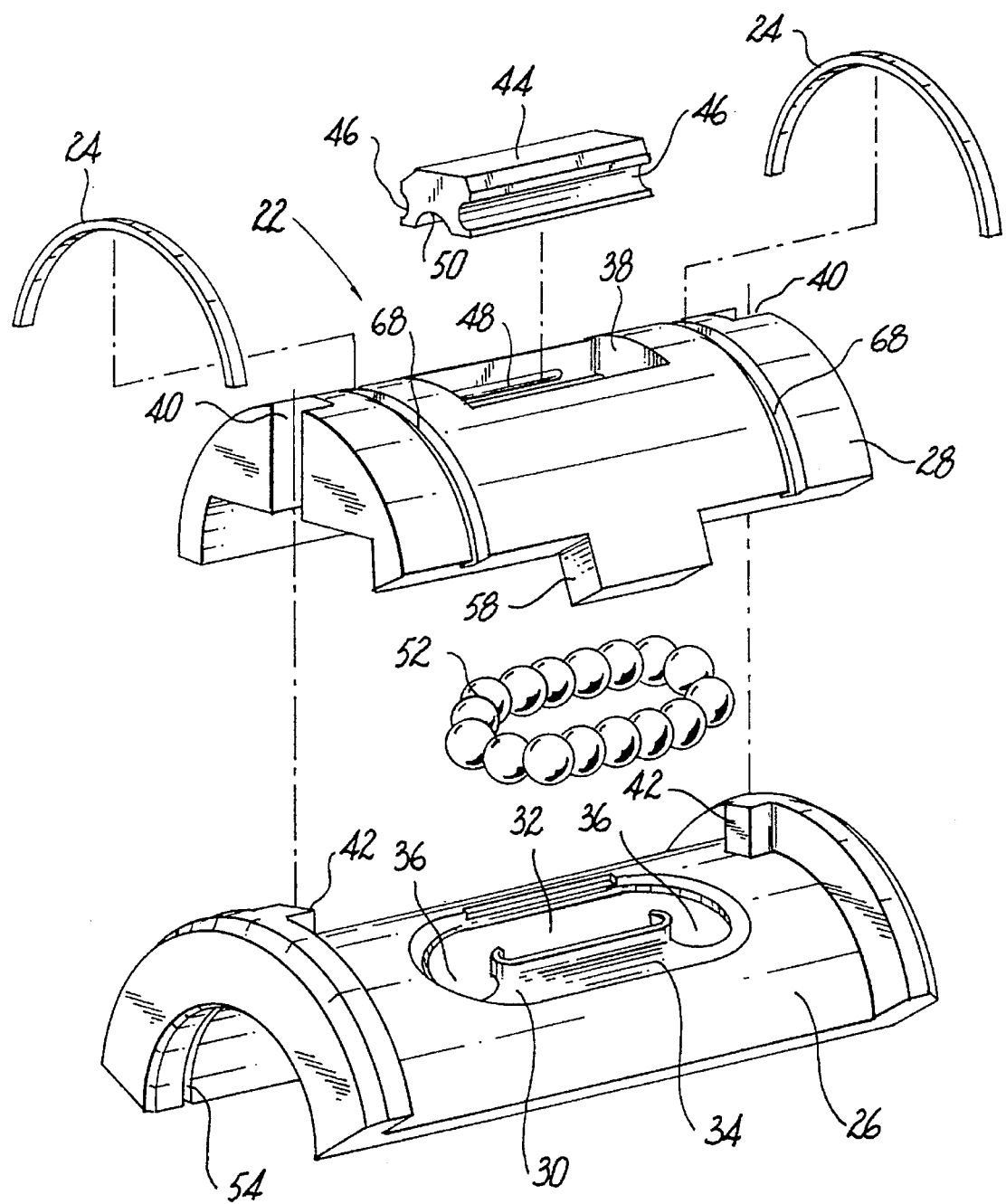
FIG. 2 is an exploded perspective view of an arcuate interengageable self-contained ball retainer segment in accordance with the linear motion bearing assembly of FIG. 1.

Referring now to FIG. 2 in conjunction with FIG. 1, arcuate interengageable self-contained ball retainer segment 22 includes inner portion 26 defining ball track 30 therein. Ball track 30 is made up of a load bearing portion 32 and a return portion 34 interconnected by turnarounds 36. An outer lid portion 28 is configured to snap fit into engagement with inner portion 26 and includes a load bearing plate mounting aperture 38. In the embodiment depicted in FIG. 2, snap fit engagement is accomplished by overcut grooves 40 in the outer lid portion 28 and undercut projections 42 formed in the inner portion 26. Other engagement mechanisms, such as pins, grooves, adhesives, etc. are also contemplated and are within the scope of knowledge of one skilled in this art.

Load bearing plate 44 is dimensioned and configured to fit into aperture 38 of outer lid portion 28. A pair of longitudinal grooves 46 are formed in the side walls of load bearing plate 44, which grooves receive projections 48 formed in the periphery of aperture 38. Load bearing plate 44 preferably includes at least one longitudinal track 50 formed in an inner surface thereof. This track 50 serves as the upper surface of the load bearing portion 32 of ball track 30. A plurality of bearing balls 52 are positioned in ball track 30 and, when in the load bearing portion, serve to transmit loads from the load bearing plates 44 to a shaft (not shown) as well as facilitating reciprocal longitudinal motion therealong.

Inner portion 26 further includes an inner annular groove 54 which, when the linear motion bearing assembly is fabricated, serves to receive and retain wiper 56. See, FIG. 1. This configuration is a marked improvement in the art and eliminates the need for separate wiper structure attached to the ends of the bearing.

In order to facilitate assembly and alignment, arcuate interengageable self-contained ball retainer segments 22 are preferably provided with alignment structure such as, e.g. rectangular projection 58 which interfits with a corresponding rectangular groove 60 formed in an abutting side of another segment. One skilled in the art will readily appreciate that other assembly and abutment structure could be substituted including, pins and bores, keys, etc.

Figure 3:
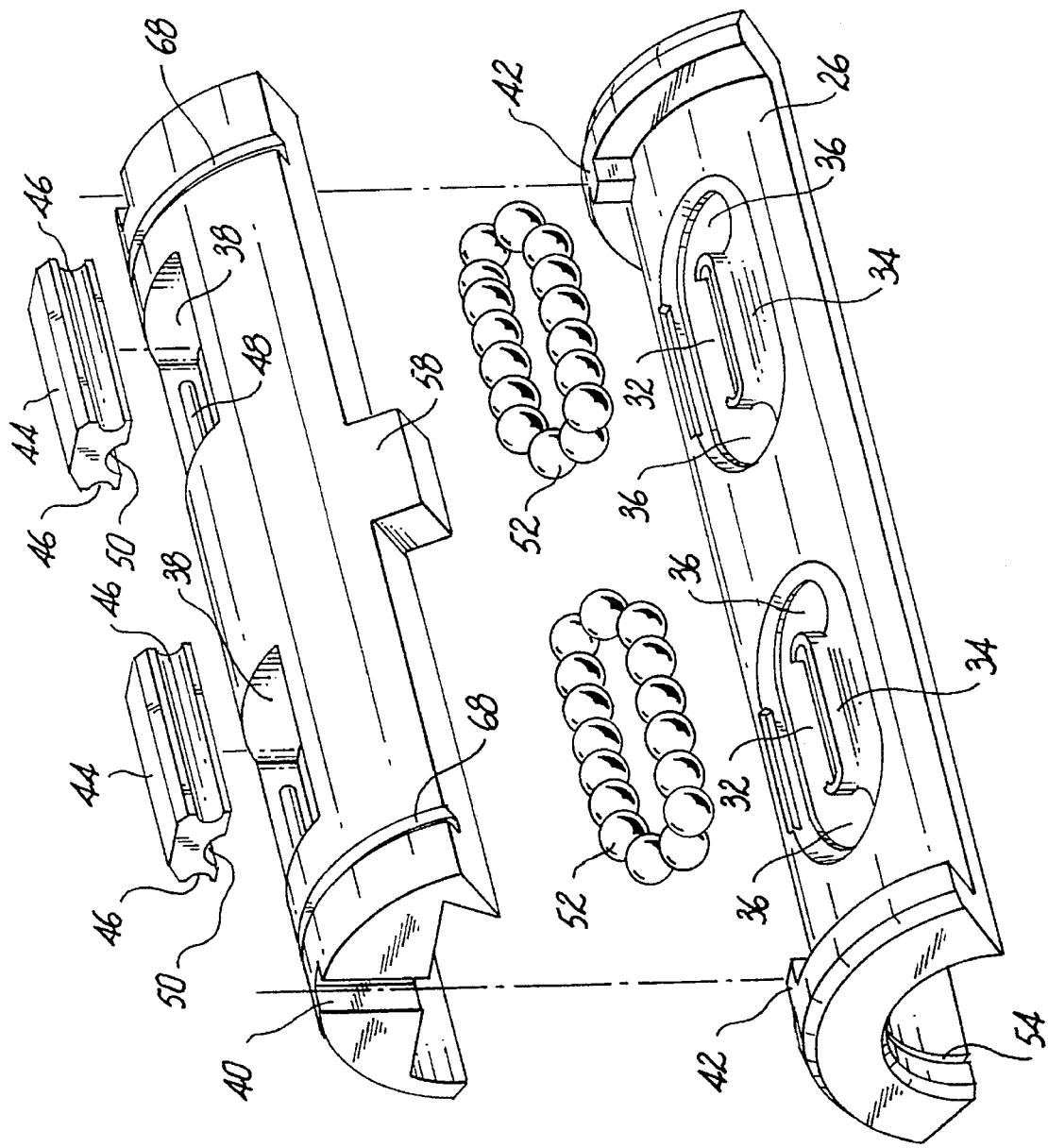
FIG. 3 is an exploded perspective view of an alternate embodiment of an arcuate interengageable self-contained ball retainer segment having a pair of ball tracks therein.
Figure 4:
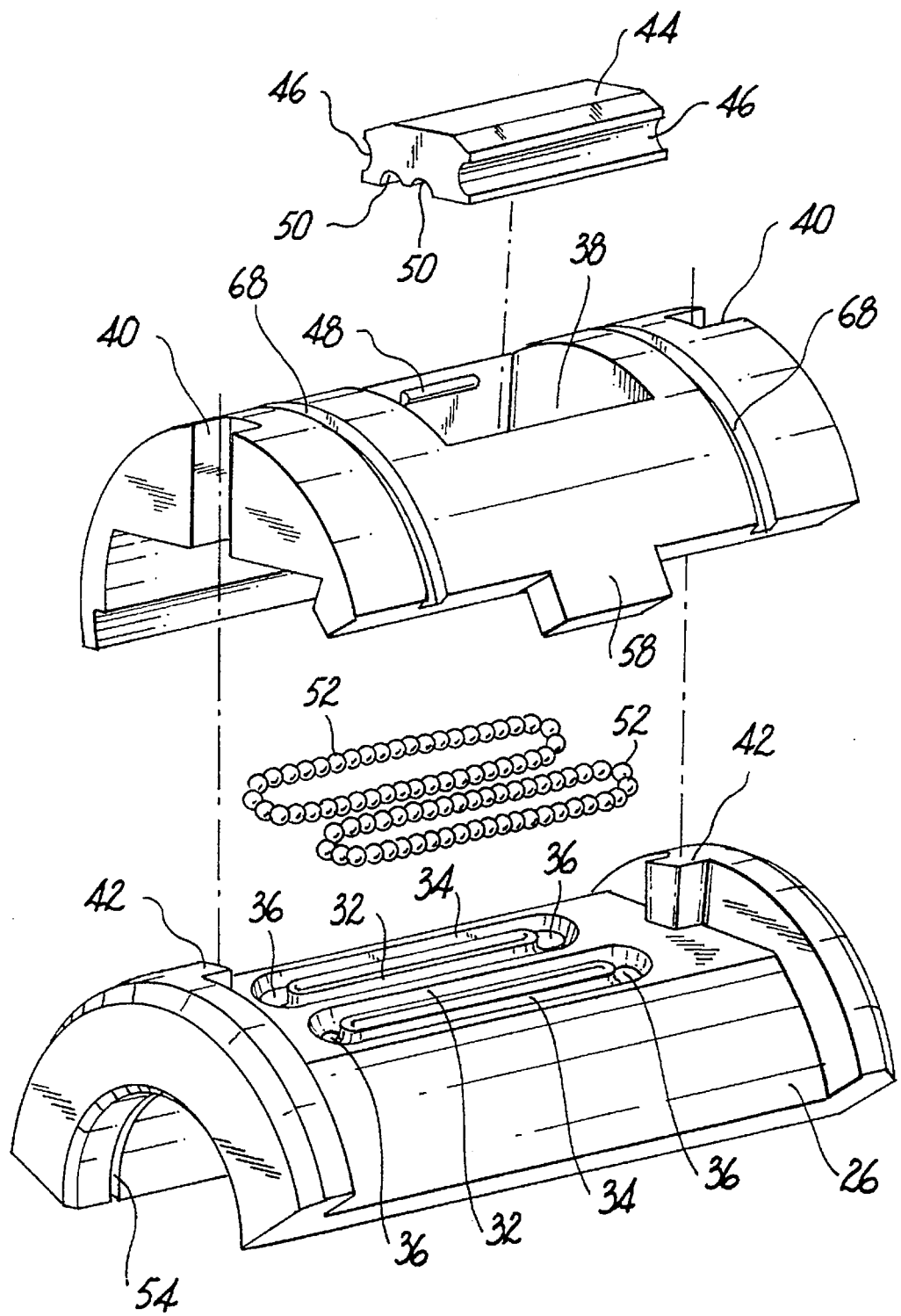
FIG. 4 is an exploded perspective view of another alternative embodiment of an arcuate interengageable self-contained ball retainer having a pair of parallel ball tracks therein.

Referring now to FIGS. 3 and 4, other preferred embodiments of an arcuate interengageable self-contained ball retainer segment 62, 64 are shown. These embodiments are substantially similar to the segment 22 shown in FIGS. 1 and 2 with the exception that in segment 62, a pair of ball tracks 30 are formed in axial alignment in the inner portion of the segment 62, and in segment 64, a pair of ball tracks 30 are formed in side-by-side relation in the inner portion of the segment 64. Also, in segment 64, the load bearing plate 44 is configured and positioned so as to accommodate the load bearing portions 32 of both ball tracks 30. This configuration includes the provision of a second longitudinal track 50 formed on the inner surface of the load bearing plate 44.

Figure 5:
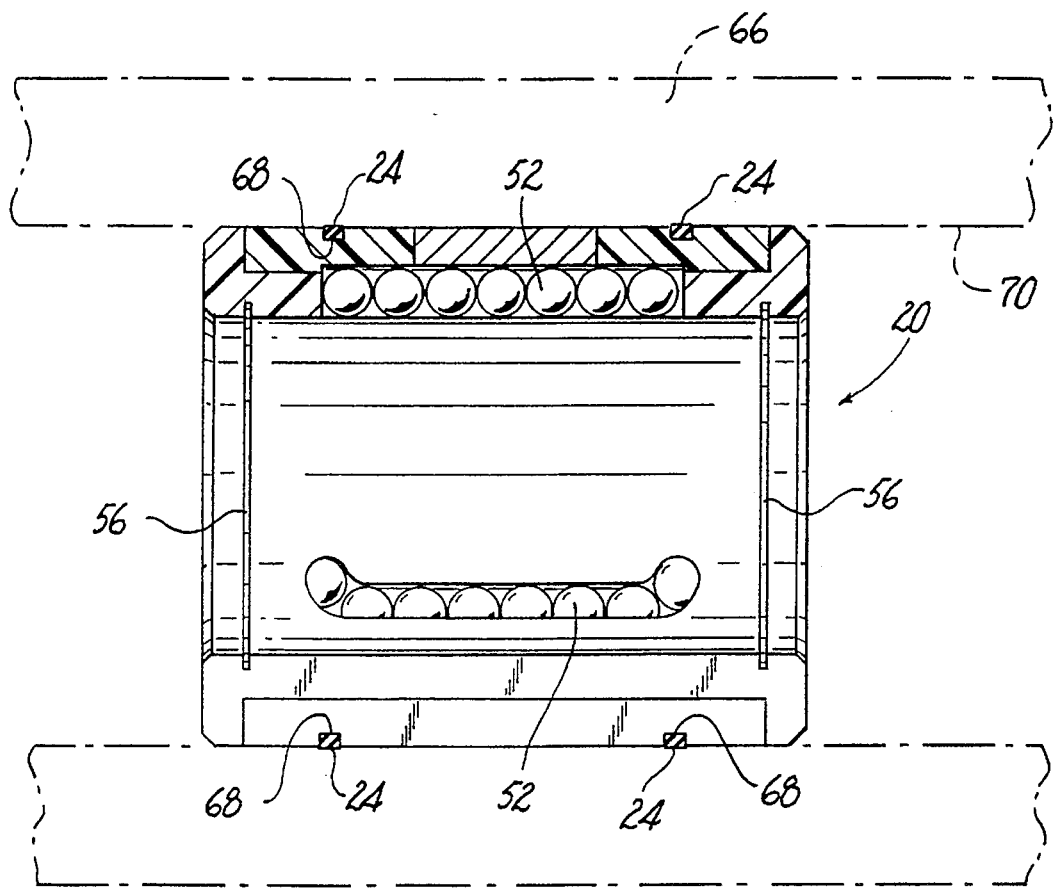
FIG. 5 is a cross-sectional view of the linear motion bearing assembly taken along line 5—5 of FIG. 1.

Referring now to FIG. 5, a linear motion bearing assembly 20 is shown positioned within a bore 70 of carriage 66. The plurality of arcuate interengageable self-contained ball retainer segments 22 are held in place by elastic retainer rings 24 which rings interfit in grooves 68. In one preferred embodiment, retainer ring 24 is formed of a resilient engineering plastic and the groove 68 is dimensioned such that at least a portion of the ring 24 extends beyond the outer surface of the linear motion bearing assembly 20. In this embodiment, the frictional contact between the ring 24 and the inner surface of the carriage bore serves to stabilize the bearing assembly 20 within the bore 70.

Figure 6:
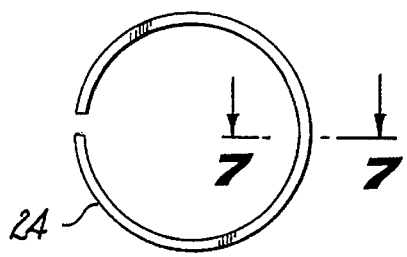
FIG. 6 is a side view of a C-shaped retainer ring for use with the assembled linear motion bearing assembly of FIG. 1.
Figure 7:
FIG. 7 is a cross-sectional view of the retainer ring of FIG. 6 taken along line 7—7.
Figure 6A:
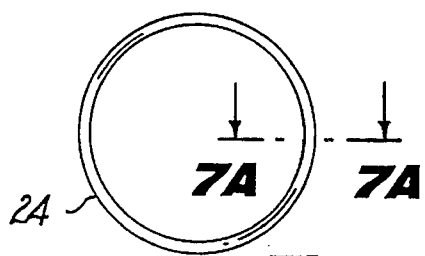
FIG. 6A is a side view of an alternate retainer ring for use with the assembled linear motion bearing assembly of FIG. 1.
Figure 7A:
FIG. 7A is a cross-sectional view of the retainer ring of FIG. 6A taken along line 7A—7A.

Retainer ring 24 may, advantageously, be formed in a wide variety of cross-sectional shapes. FIGS. 6 and 7 show a C-shaped retainer ring 24 having a substantially square cross-section. FIGS. 6A and 7A show a retainer ring 24 with a substantially circular cross-section. It is also contemplated that retainer ring 24 may be fabricated from a wide variety of engineering plastics, polymer, rubbers, and metals depending upon the applications of and demands on the bearing. Also, where permanent placement of the bearing assembly is desired, retainer ring 24 may be in the form of a resilient C-ring which can be snap fit into a corresponding groove on an interior surface of a carriage bore to lock the bearing assembly into place.

Figure 8:
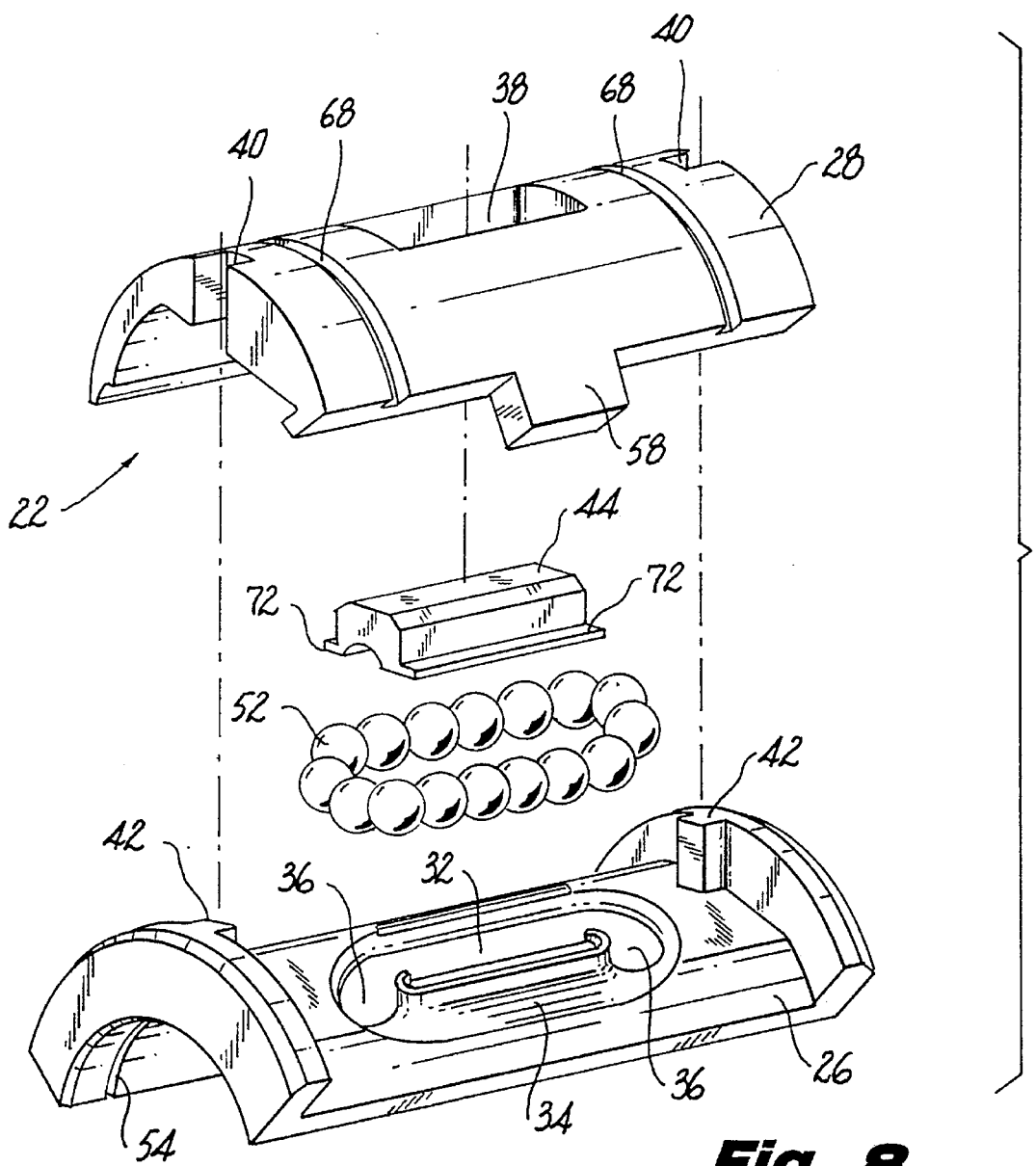
FIG. 8 is an exploded perspective view of an alternative embodiment of arcuate interengageable self-contained ball retainer in accordance with another embodiment of the present invention.
Figure 9:
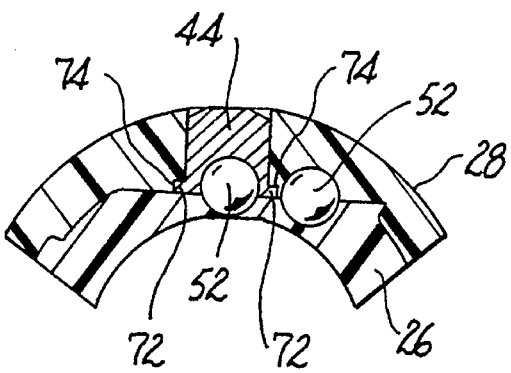
FIG. 9 is a cross-sectional view of FIG. 8.

Referring now to FIGS. 8 and 9, another preferred embodiment of arcuate interengageable self-contained ball retainer segment 22 is shown. This embodiment is substantially similar to the embodiment of FIGS. 1 and 2 discussed in detail above with the exception of outer lid portion 28 and load bearing plate 44. In this embodiment, a pair of longitudinally extending flanges 72 are provided on load bearing plate 44. These flanges 72 fit into corresponding grooves 74 formed in outer lid portions 28 (See, FIG. 9). Thus, load bearing plate 44 is maintained within load bearing plate mounting aperture 38, without the need of projections 48 (See, FIG. 2).

Linear motion bearing assemblies 20 in accordance with the embodiments shown and described herein are efficiently and easily assembled using a novel process. The steps of this process include providing a plurality of arcuate interengageable self-contained ball retainer segments with each segment having at least one ball track therein. These segments may advantageously be fabricated from an engineering polymer and later assembled with bearing balls and load bearing plates. Once the ball retainer segments are complete, the segments are assembled adjacent one another to form a complete linear motion bearing assembly. Retainer rings may be positioned around the segments to assist in holding the segments in a desired orientation. This self-contained segment arrangement is extremely cost efficient and totally eliminates the need for separate outer housing structure to encircle the bearing elements.

To the extent not already indicated, it also will be understood by those of ordinary skill in the art that any one of the various specific embodiments herein described and illustrated may be further modified to incorporate features shown in the other specific embodiments.

The invention in its broader aspects therefore is not limited to the specific embodiments herein shown and described but departures may be made therefrom within the scope of the accompanying claims without departing from the principles of the invention and without sacrificing its chief advantages.

I claim:

1. A linear motion bearing assembly for movement along a shaft comprising:

a ball retainer formed of a plurality of interengageable self-contained ball retainer segments, each of said segments including an inner portion defining at least one ball track having a load bearing portion and a return portion, an outer lid portion defining a load bearing plate aperture therein and interengageable structure for interengagement of said ball retainer segments;

a load bearing plate positioned in the load bearing plate aperture of the outer lid portion such that the load bearing plate is positioned adjacent the load bearing portion of the ball track; and a plurality of bearing balls disposed in said ball track for transmitting load from the shaft to the load bearing plate and facilitating movement of the linear motion bearing assembly along said shaft.

2. The linear motion bearing assembly of claim 1 wherein said ball retainer is formed of three arcuate interengageable self-contained ball retainer segments.

3. The linear motion bearing assembly of claim 1 wherein each of said ball retainer segments includes a pair of ball tracks and at least one load bearing plate therein.

4. The linear motion bearing assembly of claim 3 wherein said pair of ball tracks are arranged in longitudinal alignment within said ball retainer segment.

5. The linear motion bearing assembly of claim 3 wherein said pair of ball tracks are arranged in side-by-side configuration within said ball retainer segment.

6. The linear motion bearing assembly of claim 1 wherein said arcuate interengageable self-contained ball retainer segment includes at least one groove formed in an outer arcuate surface thereof for receiving a retainer ring therein, said retainer ring functioning to assist in holding said arcuate interengageable self-contained ball retainer segments in a substantially cylindrical configuration.

7. The linear motion bearing assembly of claim 6 wherein a portion of said retainer ring extends beyond the outer arcuate surface of said interengageable self-contained ball retainer segment.

8. The linear motion bearing assembly of claim 1 further comprising an integral shaft wiper.

9. The linear motion bearing assembly of claim 8 wherein said integral shaft wiper is retained in a groove formed in an inner arcuate surface of said interengageable self-contained ball retainer segment.

10. The linear motion bearing assembly of claim 1 wherein said outer lid portion includes load bearing plate engagement structure positioned in a perimeter portion of the load bearing plate aperture for engaging said load bearing plate positioned therein.

11. The linear motion bearing assembly of claim 10 wherein said inner portion and said outer lid portion snap fit together to form said arcuate interengageable self-contained ball retainer segment.

12. A linear motion bearing assembly for movement along a shaft comprising:

a ball retainer formed of three arcuate interengageable self-contained ball retainer segments, each of said segments defining an arc of 120° and including an inner portion defining a ball track with a load bearing portion and a return portion and an outer lid portion defining a load bearing plate aperture therein;

a load bearing plate mounted in each of said load bearing plate aperture of said ball retainer segments adjacent said load bearing portion of said ball track; and a plurality of bearing balls disposed in said ball track for transmitting load from the shaft to the load bearing plate and facilitating movement of the linear motion bearing assembly along said shaft.

13. The linear motion bearing assembly of claim 12 wherein said arcuate interengageable self-contained ball retainer segment includes at least one groove formed in an outer arcuate surface thereof for receiving a retainer ring therein, said retainer ring functioning to assist in holding said arcuate interengageable self-contained ball retainer segments in a cylindrical configuration.

14. The linear motion bearing assembly of claim 12 further comprising an integral shaft wiper.

15. The linear motion bearing assembly of claim 12 wherein said ball retainer forms a closed bearing.

16. The linear motion bearing assembly of claim 12 wherein said arcuate interengageable self-contained ball retainer segment includes load bearing plate engagement structure positioned in a perimeter portion of the load bearing plate aperture for engaging said load bearing plate positioned therein.

17. The linear motion bearing assembly of claim 16 wherein said inner portion and said outer lid portion snap fit together to form said arcuate interengageable self-contained ball retainer segment.

18. The linear motion bearing assembly of claim 16 wherein said outer lid portion defines an undercut aperture and said load bearing plate includes a flange dimensioned and configured to be received within said undercut aperture of said outer lid portion.

19. The linear motion bearing assembly of claim 16 wherein said outer lid portion defines an aperture having a pair of projections extending into said aperture and said load bearing plate includes a pair of longitudinal grooves dimensioned and configured to snap fit said load bearing plate into operative position in said aperture.

20. A process for assembling a linear motion bearing assembly comprising the steps of:

providing a plurality of arcuate interengageable self-contained ball retainer segments, each of said segments including an inner portion defining at least one ball track having a load bearing portion and a return portion an outer lid portion defining a load bearing plate aperture therein and interengagement structure;

loading a plurality of bearing balls into said ball track;

positioning a load bearing plate in said load bearing plate aperture adjacent the load bearing portion of the ball track; and interengaging said self-contained ball retainer segments to form a linear motion bearing assembly.

21. The process for assembling a linear motion bearing assembly as in claim 20 wherein the inner portion defining said ball track and the outer lid portion engaging said load bearing plate are assembled by snap fitting the inner portion and the outer lid portion together to substantially enclose said bearing balls and ball tracks.

\* \* \* \* \*